United States Patent [19]
Kim

[11] Patent Number: 5,999,803
[45] Date of Patent: Dec. 7, 1999

[54] RECEIVED SIGNAL STRENGTH DETECTOR FOR A MOBILE COMMUNICATIONS SYSTEM

[75] Inventor: Yong-Il Kim, Euiwang, Rep. of Korea

[73] Assignee: Samsung Electronics Co., Ltd., Kyungki, Rep. of Korea

[21] Appl. No.: 08/878,184

[22] Filed: Jun. 18, 1997

[30] Foreign Application Priority Data

Jun. 24, 1996 [KR] Rep. of Korea ............. 96-23336

[51] Int. Cl.⁶ ......................................... H04B 17/00
[52] U.S. Cl. .............................. 455/226.2; 455/67.1
[58] Field of Search ........................... 455/226.1, 226.2, 455/226.4, 67.1, 67.7, 161.3, 311, 341, 575

[56] References Cited

U.S. PATENT DOCUMENTS

| | | | |
|---|---|---|---|
| 3,821,649 | 6/1974 | Grosjean | 455/226.2 |
| 4,479,253 | 10/1984 | Daniel, Jr. | 455/226.2 |
| 4,620,114 | 10/1986 | Moon | 455/226.2 |
| 5,193,210 | 3/1993 | Nicholas et al. | 455/226.1 |
| 5,199,109 | 3/1993 | Baker | 455/161.3 |
| 5,212,834 | 5/1993 | Nuqvist | 455/311 |
| 5,390,365 | 2/1995 | Enoki et al. | 455/226.2 |
| 5,430,893 | 7/1995 | Myer | 455/209 |
| 5,487,186 | 1/1996 | Scarpa | 455/192.2 |
| 5,489,868 | 2/1996 | Gilbert | 327/351 |
| 5,603,113 | 2/1997 | De Loe, Jr. | 455/234.1 |
| 5,630,210 | 5/1993 | Marry et al. | 455/226.4 |
| 5,630,219 | 5/1997 | Matsuki et al. | 455/226.2 |
| 5,689,814 | 11/1997 | Hagisawa | 455/226.2 |

*Primary Examiner*—Dwayne D. Bost
*Assistant Examiner*—Quochien B. Vuong
*Attorney, Agent, or Firm*—Robert E. Bushnell, Esq.

[57] ABSTRACT

A received signal strength detector for a receiver of a mobile communications system includes: a first intermediate frequency processor for processing a transmitted radio frequency signal at a first intermediate frequency zone to produce a first intermediate frequency signal; a second intermediate frequency processor for processing the first intermediate frequency signal at a second frequency zone to produce a second intermediate frequency signal; a first path connected to an output terminal of the second intermediate frequency processor for providing a flow path for a current corresponding to the strength of the second intermediate frequency signal; and a second path for providing an additional flow path for the current flowing through the first path in response to the first intermediate frequency signal.

16 Claims, 4 Drawing Sheets

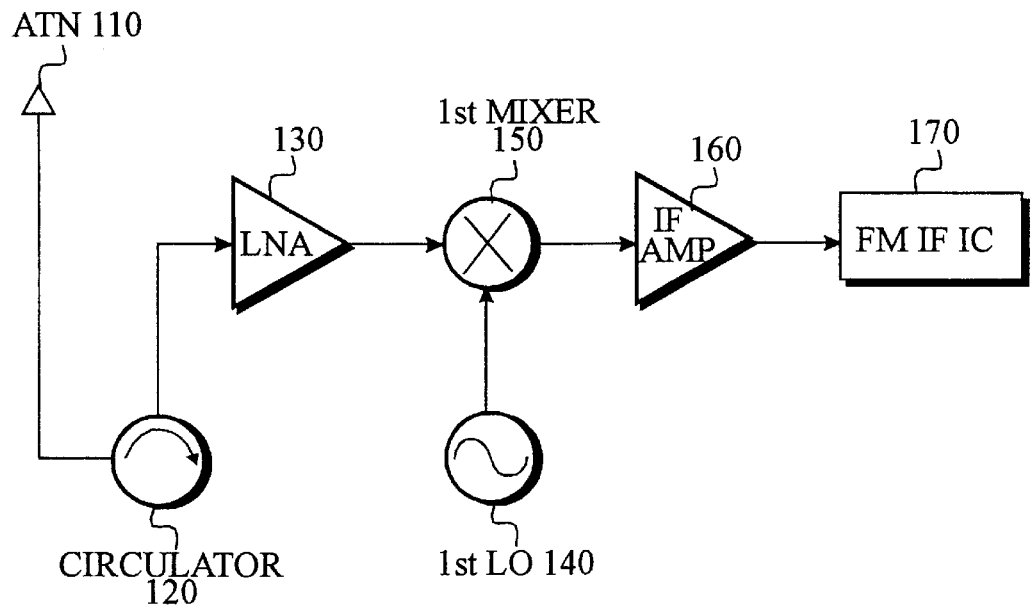
FIG. 1 *(Prior Art)*
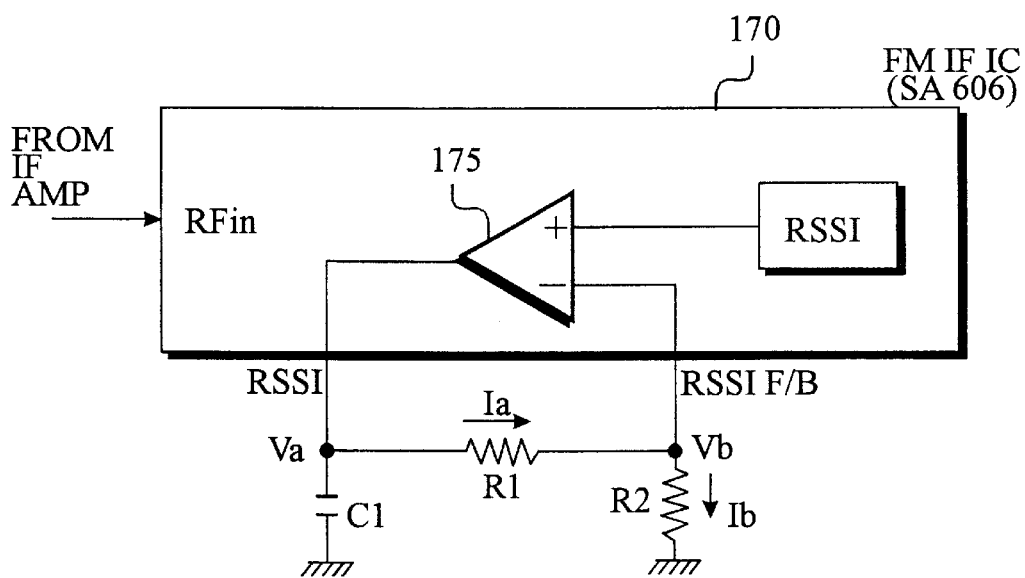
FIG. 2 *(Prior Art)*

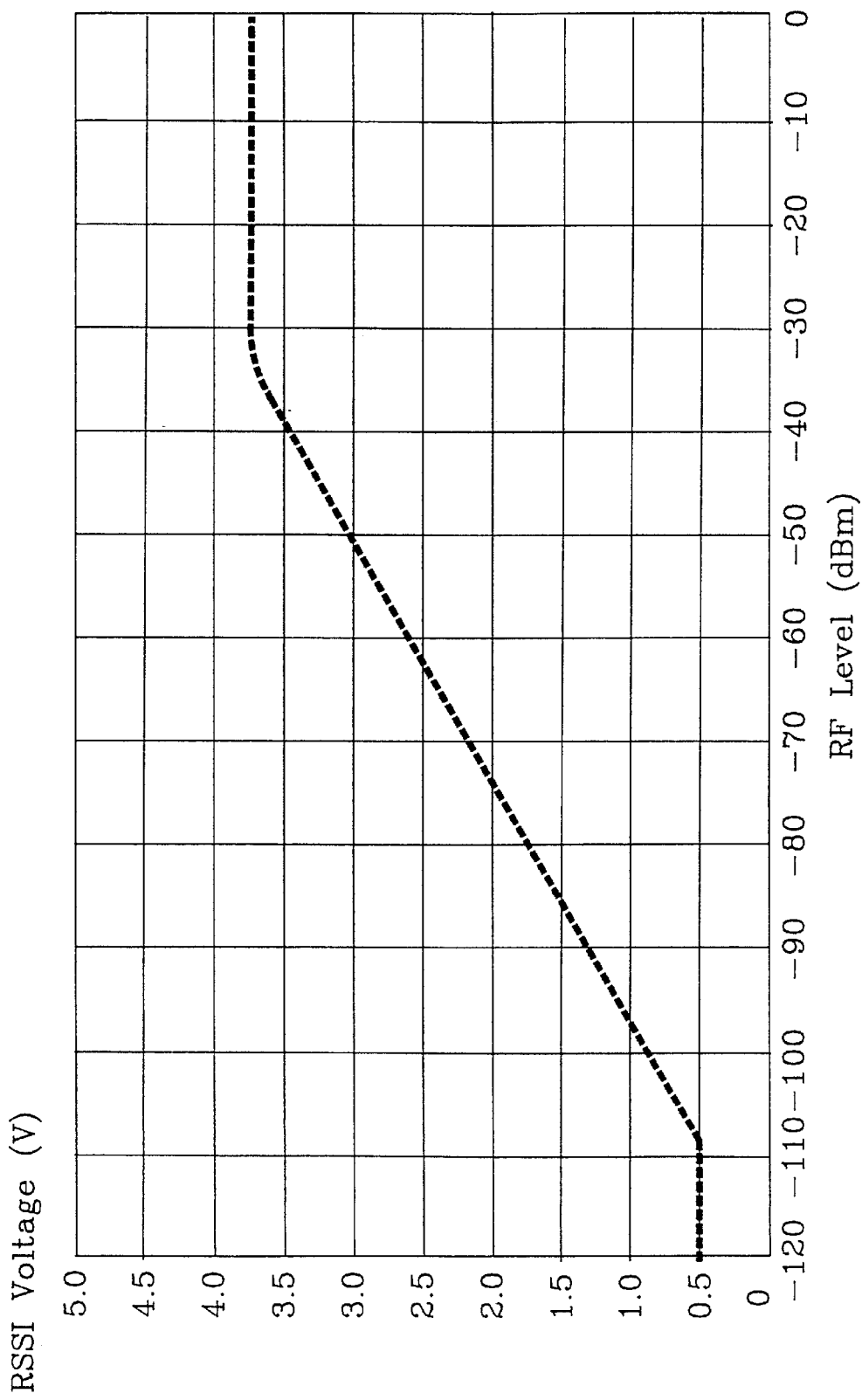
FIG. 3 *(Prior Art)*

RECEIVED SIGNAL STRENGTH DETECTOR FOR A MOBILE COMMUNICATIONS SYSTEM

This application makes reference to, incorporates the same herein, and claims all benefits accruing under 35 U.S.C. §119 from an application for DETECTION CIRCUIT OF RECEIVED SIGNAL STRENGTH OF A MOBILE COMMUNICATIONS SYSTEM earlier filed in the Korean Industrial Property Office on the 24$^{th}$ day of Jun. 1996 and there duly assigned Ser. No. 23336/1996, a copy of which application is annexed hereto.

BACKGROUND OF THE INVENTION

1. Field of the Invention

The present invention relates to a receiver of a mobile communications system, particularly to a received signal strength detector which can extend the dynamic range of the received signal strength and minimize variations in the detection voltage of the received signal strength.

2. Description of the Related Art

Generally, a receiver of a mobile communications system performs detection of a signal received through an antenna. The received signal strength indicator (hereinafter referred to as "RSSI") thus detected is used for control of the transmission output level, setting of a near value and a far value at the time of link setting, hand-off function, etc. which means that it is an element which can guarantee smooth operation of the mobile communications system.

In a receiver of a mobile communications system which performs the above-described operations, a radio frequency signal received from the air through an antenna is supplied to a low noise amplifier through a circulator. The low noise amplifier amplifies at low noise a radio frequency signal supplied through the circulator, and a first mixer mixes and outputs the radio frequency signal, which is amplified at low noise, and a frequency signal, which is generated by a first local oscillator. The signal outputted at this time is a signal at an intermediate frequency zone. An intermediate frequency amplifier amplifies the signal at the intermediate frequency zone and outputs it to an IF processor. The IF processor then receives the outputted signal of the intermediate frequency amplifier, and performs various processing operations to be done at the intermediate frequency zone.

The IF processor is composed of a second mixer, a second oscillator, a second IF amplifier, a limiter, a quadrature detector, an audio signal amplifier, a voltage regulator, a logarithmic amplifier, etc. and performs various processing operations to be done at the intermediate frequency zone. For the IF processor, a frequency modulation IF integrated circuit of Type SA606 manufactured and sold by the Philips Company of the Netherlands may be used typically.

An IF processor composing an earlier RSSI detection circuit and its surrounding circuits are explained in detail on pages 355 through 367 of a data book published by the Philips Company on Oct. 26, 1993 under the title "Philips Semiconductor RF Communications Products.

The IF processor has an RFin terminal and inputs the signal amplified by the intermediate frequency amplifier. The amplitude of the inputted signal is limited to a certain degree by a limiter and is supplied to a non-inverting input terminal (+) of a logarithmic amplifier for detection of the RSSI. The output terminal of the logarithmic amplifier is connected to the RSSI terminal of the IF processor, while an inverting input terminal (−) is connected to an RSSI F/B terminal of the IF processor. A capacitor connected between the RSSI terminal of the IF processor and a ground terminal, a first resistor connected between the RSSI F/B terminal and the ground terminal, and a second resistor connected between the RSSI terminal and the RSSI F/B terminal are surrounding constituent elements which enable detection of the RSSI.

The detection of the RSSI is possible by detecting a voltage Va appearing at the RSSI terminal of the IF processor. That is, once the value of the Va voltage is detected, the RSSI can be detected by a graph of the RF signal level versus RSSI voltage. However, there is a range in which the value of Va voltage is varied as the level of the RF signal is changed as well as a range in which the value of Va voltage is not varied even when the level of the RF signal is changed. The former range is called an RSSI dynamic range. When the RF signal corresponding to the level in this range is supplied to the IF processor, detection of the RSSI is possible from the value of Va voltage. However, if the RF signal corresponding to the level in the latter range, called the RSSI saturation range, is supplied to the IF processor, detection of the RSSI from the value of Va voltage becomes impossible since if a Va of about 3.75 volts is detected, there is no way of knowing whether the level of RF signal corresponding to that voltage is −30 dBm, −20 dBm, or −10 dBm.

In summary, the RSSI dynamic range of the IF processor is limited to a constant range (generally a range of −30 dBm through −110 dBm). Therefore, in case of an earlier receiver of the mobile communications system, the level of the received signal can be detected only when an RF signal of a level corresponding to a −30 dBm through −110 dBm range is supplied to the IF processor.

In the meantime, the earlier mobile communications system is designed to have a low transmission output to minimize interference and a high gain for elements such as a circulator, an LNA, a mixer, an IF amplifier, etc. composed ahead of the IF processor in order to improve receiving sensitivity. For example, in case of a second generation cordless telephone (CT-2) system, it is designed to have the gain of a circulator of −1 dB, that of an LNA of +20 dB, that of a mixer of +6 dB, and that of an IF amplifier of +5 dB (that is, the gain ahead of the IF processor of about 30 dB). However, the gain of the elements ahead of the IF processor should be designed taking into consideration the RSSI dynamic range permitted by the IF processor, and not freely without any restrictions. The higher the gain of the elements ahead of the IF processor, the smaller the range of the RF signal level which can be detected at the IF processor. As an example, when the gain of the elements ahead of the IF processor is designed to be 30 dB, detection of the RSSI is possible if the range of the level of the RF signal transmitted from the transmitter is less than −60 dBm.

On the other hand, to be noted is that the stable range of the level of the RF signal received by an antenna should be more than about −90 dBm taking into consideration the Rayleigh fading phenomena and thermal noise of the receiver which are seen for the mobile communications system of the pico cell concept such as the CT-2 system.

Therefore, taking into consideration the above-described items, the RSSI dynamic range which can be received by an antenna without having a saturated IF processor is merely about 25 dB (−60 dBm through −90 dBm). It can be seen that the RSSI dynamic range of a receiver for the earlier mobile communications system is very narrow. Accordingly, the number of objects of transmitted output which can be controlled by the receiver becomes smaller, and there are interfering signals in the RF signal because of uncontrolled transmitted outputs, which means communications becomes of low quality eventually. In addition, there is a problem of a narrower set range of a near value and a far value which can be used effectively for link setting as the RSSI dynamic range becomes narrower.

The following patents each disclose feature in common with the present invention but do not teach or suggest the specifically recited received signal strength detector for a mobile communications system of the present invention: U.S. Pat. No. 5,390,365 to Enoki el al., entitled Radio Communication Apparatus Having A Received Signal Strength Measuring Function, U.S. Pat. No. 5,193,210 to Nicholas el al., entitled Low Power RF Receiver, U.S. Pat. No. 4,620,114 to Moon, entitled Signal Strength Detector, U.S. Pat. No. 5,430,893 to Myer, entitled Radio Receiver With Increased Dynamic Range, U.S. Pat. No. 5,603,113 to De Loe Jr., entitled Automatic Gain Control Circuit For Both Receiver And Transmitter Adjustable Amplifiers Including A Linear Signal Level Detector With DC Blocking, DC Adding, And AC Removing Components, U.S. Pat. No. 5,487,186 to Scarpa, entitled Automatic Frequency Control Using Split-Band Signal Strength Measurements, U.S. Pat. No. 5,489,868 to Gilbert, entitled Detector Cell For Logarithmic Amplifiers.

SUMMARY OF THE INVENTION

It is an object of the invention to provide a mobile communications system with a circuit for extending the RSSI dynamic range.

It is another object of the invention to provide a mobile communications system with an RSSI detection circuit for extending the control range of the transmitted output.

It is still another object of the invention to provide an RSSI detection circuit for minimizing interference signal within an RF signal received by a receiver of the mobile communications system.

It is a further object of the invention to provide an RSSI detection circuit for improving the communication quality of the mobile communications system.

It is further another object of the invention to provide an RSSI detection circuit for extending the set range of a near value and a far value for effective link setting of the mobile communications system.

It is further another object of the invention to provide an RSSI detection circuit to freely design the gain of the elements ahead of the IF processor for the mobile communications system.

It is further another object of the invention to provide an RSSI detection circuit for improving the receiving sensitivity of the mobile communications system.

These and other objects may be achieved with an RSSI detection circuit constructed according to the principles of the present invention which includes a current amplification circuit connected additionally to an RSSI F/B terminal of the IF processor as well as a variable resistor connected additionally between an RSSI terminal and an RSSI F/B terminal.

In the first aspect of the present invention, the detection circuit of a received signal strength for a receiver of a mobile communications system comprises a first intermediate frequency processor for processing a transmitted radio frequency signal at a first intermediate frequency zone to produce a first intermediate frequency signal, a second intermediate frequency processor for processing the first intermediate frequency signal at a second frequency zone to produce a second intermediate frequency signal, a first path connected to the output terminal of the second intermediate frequency processor for providing a flow path for a current corresponding to the strength of the second intermediate frequency signal, and a second path for providing an additional flow path for the current flowing through the first path in response to generation of the first intermediate frequency signal.

The first path comprises more than one resistor, e.g., first and second variable resistor connected between the output terminal of the second intermediate frequency processor and ground. The second path connects the output terminal of the first intermediate frequency processor to the first path, and comprises a transistor with the base connected to the output terminal of the first intermediate frequency processor, the collector connected to the connecting point of the first and second resistors, and the emitter connected to ground.

In the second aspect of the invention, a detection circuit of a received signal strength for a receiver of a mobile communications system comprises a first intermediate frequency processor for processing a transmitted radio frequency signal at a first intermediate frequency zone to produce a first intermediate frequency signal, a second intermediate frequency processor for processing the first intermediate frequency signal at a second frequency zone to produce a second intermediate frequency signal, a current path connected to an output terminal of the second intermediate frequency processor to provide a flow path for a current corresponding to the strength of the second intermediate frequency signal, and a current increasing circuit for increasing the amount of the current flowing through current path if any first intermediate frequency signal is detected.

The current path comprises more than one resistor, e.g., first and second variable resistors connected between the output terminal of the second intermediate frequency processor and ground. The current increasing circuit connects the output terminal of the first intermediate frequency processor to the first path in response to generation of the first intermediate frequency signal, so that the amount of current flowing through said current path is increased as the level of said first intermediate frequency signal becomes greater. The current increasing circuit comprises a transistor equipped with a base terminal connected to the output terminal of the first intermediate frequency processor, a collector connected to the connecting point of the first resistor and said second resistor, and an emitter connected to ground.

In a third aspect of the invention, a detection circuit of a received signal strength for a receiver of a mobile communications system comprises a first intermediate frequency processor for processing a transmitted radio frequency signal at a first intermediate frequency zone to produce a first intermediate frequency signal, a second intermediate frequency processor for processing the first intermediate frequency signal at a second frequency zone to produce a second intermediate frequency signal, a current path connected between the output terminal of the second intermediate frequency processor and ground for providing a flow path for a current corresponding to the strength of the second intermediate frequency signal, and a variable current element connected between the output terminal of the second intermediate frequency processor and the current path for controlling the amount of a current corresponding to the strength of the second intermediate frequency signal.

The current path comprises a first resistor and a second resistor connected in series between the output terminal of the second intermediate frequency processor and ground. The variable current element comprises a variable resistor connected between the output terminal of the second intermediate frequency processor and the current path.

The present invention will now be described more specifically with reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 1 is a block diagram of a receiver of an earlier mobile communications system;

FIG. 2 is a block diagram showing connection of an intermediate frequency processor and its surrounding circuits in FIG. 1 which compose the earlier received signal strength detection circuit;

FIG. 3 is a graph showing the voltage of the received signal strength indicator detected by the earlier received signal strength detection circuit versus the received signal strength;

DETAILED DESCRIPTION OF THE PREFERRED EMBODIMENT(S)

Figure 4:
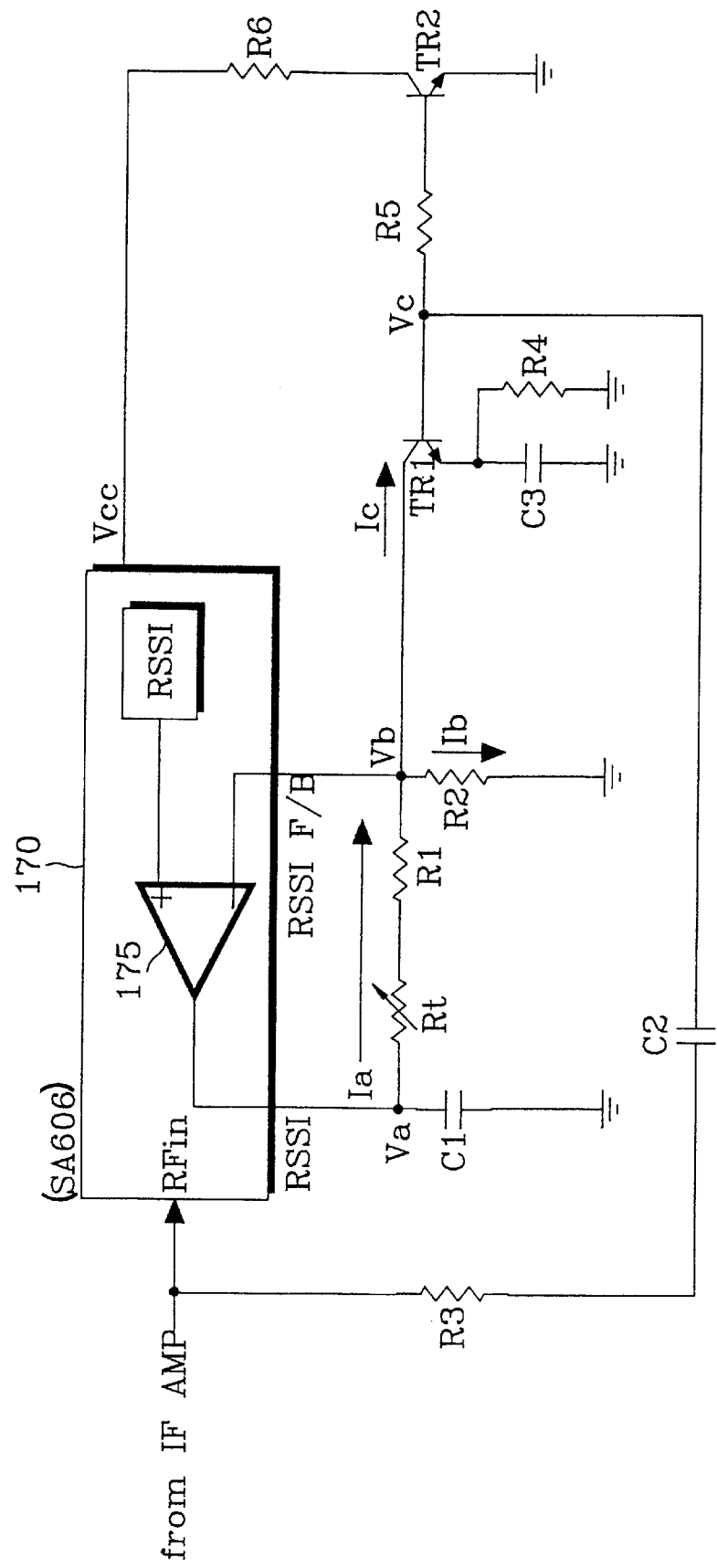
FIG. 4 is a diagram of a received signal strength detection circuit constructed according to the present invention.

FIG. 1 is a block diagram of a receiver of an earlier mobile communications system as discussed in the Description of the Related Art above while FIG. 2 is a block diagram showing the connection of an intermediate frequency processor and its surrounding circuits in FIG. 1 while FIG. 3 is a graph showing the voltage of the received signal strength indicator detected by the earlier received signal strength detection circuit versus the received signal strength.

FIG. 1 illustrates an antenna 110, a low noise amplifier 130, a circulator 120, a first mixer 150, a first local oscillator 140, and intermediate frequency amplifier 160, and IF processor 170.

As shown in FIG. 2, the IF processor 170 has an RF input terminal RFin, a logarithmic amplifier 175, a first resistor R2, a second resistor R1, and a capacitor C1.

FIG. 3 illustrates that there is a range in which the value of Va voltage is varied as the level of the RF signal is changed as well as a range in which the value of Va voltage is not varied even when the level of the RF signal is changed. The former range is called an RSSI dynamic range and the latter range is called an RSSI saturation range.

The RSSI detection circuit of a receiver of a mobile communication system in view of the first aspect of the invention is composed of a first intermediate frequency processor by which a transmitted radio frequency signal is processed at a first intermediate frequency zone and a first intermediate frequency signal is outputted; a second intermediate frequency processor by which the first intermediate frequency signal is processed at a second intermediate frequency zone and a second intermediate frequency signal is outputted; a first path which is connected to an output terminal of the second intermediate frequency processor and provides a flow path of a current corresponding to the strength of the second intermediate frequency signal; and a second path which replies to the first generated intermediate frequency signal and provides a flow path of an additional current to the current flowing through the first current path.

The above first path is composed of more than one resistor connected between an output terminal of the second intermediate frequency processor and a ground terminal. It can be a series string consisting of a variable resistor, a first resistor, and a second resistor.

The second path replies to the first intermediate frequency signal generated and connects the output terminal of the first intermediate frequency processor to the first path. It can be composed of a transistor equipped with a base terminal connected to the output terminal of the first intermediate frequency processor, a collector connected between the connecting point of the first resistor and the second resistor, and an emitter connected to the ground terminal.

The RSSI detection circuit of a receiver of a mobile communication system in view of the second aspect of the invention is composed of the first intermediate frequency processor by which a transmitted radio frequency signal is processed at the first intermediate frequency zone and the first intermediate frequency signal is outputted; the second intermediate frequency processor by which the first intermediate frequency signal is processed at the second intermediate frequency zone and the second intermediate frequency signal is outputted; a current path which is connected to the output terminal of the second intermediate frequency processor and provides a flow path of a current corresponding to the strength of the second intermediate frequency signal; and a current increasing circuit which detects whether the first intermediate frequency signal is generated and increases the amount of the current flowing through the current path if any.

The above current path is composed of more than one resistor connected between the output terminal of the second intermediate frequency processor and the ground terminal. It can be a series string consisting of a variable resistor, a first resistor, and a second resistor.

The current increasing path replies to the first intermediate frequency signal generated and connects the output terminal of the first intermediate frequency processor to the first path. It is characterized in that the larger the level of the first intermediate frequency signal, the larger the amount of the current flowing through the current path. The current increasing path can be composed of a transistor equipped with a base terminal connected to the output terminal of the first intermediate frequency processor, a collector connected between the connecting point of the first resistor and the second resistor, and an emitter connected to the ground terminal.

The RSSI detection circuit of a receiver of a mobile communication system in view of the third aspect of the invention is composed of the first intermediate frequency processor by which a transmitted radio frequency signal is processed at the first intermediate frequency zone and the first intermediate frequency signal is outputted; the second intermediate frequency processor by which the first intermediate frequency signal is processed at the second intermediate frequency zone and the second intermediate frequency signal is outputted; a current path which is connected between the output terminal of the second intermediate frequency processor and the ground terminal and provides a flow path of a current corresponding to the strength of the second intermediate frequency signal; and a current variable element which is connected between the output terminal of the second intermediate frequency processor and the current path and controls the amount of the current corresponding to the strength of the second intermediate frequency signal.

The above current path is composed of a first resistor and a second resistor which are connected in series between the output terminal of the second intermediate frequency processor and the ground terminal. The current variable element is composed of a variable resistor connected between the output terminal of the second intermediate frequency processor and the current path.

Referring to the drawings, a preferred embodiment of the present invention is described as follows:

In assigning reference numerals or codes, the same constituent element has the same reference numeral or code even when it is shown in different figures. In describing the present invention, if the detailed explanation of an already known function or composition seems to unnecessarily obscure the gist of the present invention, it has been omitted. The terms described below are defined taking into consideration of the functions of the present invention and their meanings can vary according to the intention of the user or chip designer or the custom; however, they should be defined based on the content of the entire present specification.

FIG. 4 is a diagram showing how an IF processor 170 and its surrounding circuits composing the RSSI detection circuit constructed according to the present invention are connected. As mentioned above, for the IF processor 170, an FM IF IC of Type SA606 manufactured by the Philips Company of the Netherlands can be used. Among inner compositions of this IC, other constituent elements are not shown, but a logarithmic amplifier 175 composing the RSSI detection circuit is only shown.

In FIG. 4, an RFin terminal of the IF processor 170 processes a radio frequency signal received through an antenna 110 in FIG. 1 at a certain intermediate frequency zone and connects it to the IF processor in FIG. 1 which generates the first intermediate frequency signal. A low noise amplifier 130, a first local oscillator 140, a first mixer 150, and a first intermediate frequency amplifier 160 in FIG. 1 compose a first IF processor of a receiver of the mobile communications system. Between the RSSI terminal of the IF processor 170 and the ground terminal, a series string consisting of a variable resistor Rt, a resistor R1, and a resistor R2 are connected in series as well as a capacitor C1. To the connecting point of the resistor R1 and the resistor R2, an RSSI F/B terminal, i.e., a non-inverting input terminal (−) of the logarithmic amplifier 175, is connected as well as a collector of a transistor TR1.

Between an emitter of the transistor TR1 and the ground terminal, a capacitor C3 and a resistor R4 are connected in parallel. To the base terminal of the transistor TR1, the base of a transistor TR2 is connected through a resistor R5 as well as a capacitor C2 and a resistor R3 which are connected in series. One terminal of the resistor R3 is connected to the first IF processor along with the RFin terminal of the IF processor 170. The emitter of the transistor TR2 is connected to the ground terminal, and a collector is connected to a power voltage supply terminal Vcc of the IF processor 170 through a resistor R6. The transistor TR1 is for DC amplification operating in B class, while the transistor TR2 is for DC supply biasing.

If it is assumed that a transmitted radio frequency signal is received through an antenna 110 in FIG. 1, the first processor processes the radio frequency signal received at an intermediate frequency zone and outputs it as an intermediate frequency signal. The intermediate frequency signal outputted from the first IF processor is supplied to the RFin terminal of the IF processor 170 in FIG. 2 which is the second IF processor. The IF processor 170 processes the intermediate frequency signal supplied to it by using each inner constituent element such as a second mixer, a second local oscillator, a second intermediate frequency amplifier, a limiter, a quadrature phase detector, an audio signal amplifier, a voltage regulator, and a logarithmic amplifier. At this time, to a non-inverting input terminal (+) of the logarithmic amplifier 175, an intermediate frequency signal processed by the limiter is supplied. The logarithmic amplifier 175 outputs a current corresponding to the strength of the supplied intermediate frequency signal to the RSSI terminal. The current outputted through the RSSI terminal flows through a path of a variable resistor Rt, a resistor R1, and a resistor R2 connected in series.

In the meantime, the intermediate frequency signal outputted from the first IF processor is supplied to the base terminals of the transistor TR1 and the transistor TR2 through a resistor R3 and a capacitor C2. The resistor R3 and the capacitor C2 perform a kind of signal detection functions. It is because there is no signal supplied to the base terminals of the transistor TR1 and the transistor TR2 if an intermediate frequency signal is not outputted from the first IF processor. The transistor TR1 and the transistor TR2 are turned on by an intermediate frequency signal which is supplied through the capacitor C2. At this time, to the base terminal of the transistor TR1, the voltage Vc supplied from the Vcc terminal of the IF processor 170 is caught as a reaction to turning-on of the transistor TR2. Accordingly, formed at a resistor R4 connected to an emitter of the transistor TR1 is a current flow corresponding to a voltage Vc caught by the base terminal. That is, another current flow through a path of the resistor R1 and the resistor R4 is formed.

In a circuit constructed according to the present invention, when a radio frequency signal is received through an antenna, the current outputted from an output terminal of the logarithmic amplifier 175 corresponding to the strength of the received signal flows through a path of the variable resistor Rt, the resistor R1, and the resistor R2, and also through a path of the variable resistor Rt, the resistor R1, and the resistor R4. A current flow and an RSSI voltage value in the RSSI detection circuit of the present invention are shown in Equation (1) below:

$$Ia=(Va-Vb)/(Rt+R1)$$

$$Ib=Vb/R2$$

$$Ic=Vc/R4$$

$$Ia=Ib+Ic$$

$$Va=Ia\times(Rt+R1)+Vb$$

$$=(Ib+Ic)\times(Rt+R1)+Ib\times R2$$

$$=Ib\times(Rt+R1+R2)+Ic\times(Rt+R1) \quad (1)$$

In Equation (1), Ia is a current corresponding to the strength of a received signal outputted from an output terminal of the logarithmic amplifier 175 and flowing through a resistor Rt and a resistor R1; Ib is a current flowing through a resistor R2; and Ic is a current flowing through a resistor R4. Va is a voltage corresponding to the strength of a received signal shown in an output terminal of the logarithmic amplifier 175; Vb is a voltage supplied to the resistor R2; and Vc is a voltage supplied to the resistor R4.

For reference, a current flow and an RSSI voltage value in the earlier RSSI detection circuit are shown in Equation (2) below:

$$Ia = (Va - Vb)/R1$$

$$Ib = Vb/R2$$

$$Ia = Ib$$

$$Va = Ia \times R1 + Vb$$

$$= Ib \times R1 + Ib \times R2$$

$$= Ib \times (R1 + R2) \qquad (2)$$

From Equations (1) and (2), it can be seen that an RSSI detection circuit constructed according to the present invention has an additional current flow Ic. This additional current flow enables extension of an RSSI dynamic range of the RSSI detection circuit of the present invention. When an intermediate frequency signal is supplied from the first IF processor of a receiver, the level of this intermediate frequency signal is detected by the resistor R3 and the capacitor C2, and this intermediate frequency signal is supplied to the base terminal of the transistor TR1 and increases the flow of Ic. The increased flow of Ic eventually extends the level of an input signal of the IF processor 170.

The fact that the dynamic range of an RSSI is extended as the amount of the current flowing through the RSSI terminal of the IF processor 170 is increased is shown on pages 2-78 through 2-80 of a data book titled "Motorola Communications Device Data" by the Motorola Company of the U.S.A. The content on pages 2-78 through 2-80 is for Types MC3371 and MC3372 which are low power narrowband FM IF ICs manufactured and sold by the Motorola Company.

Figure 5:
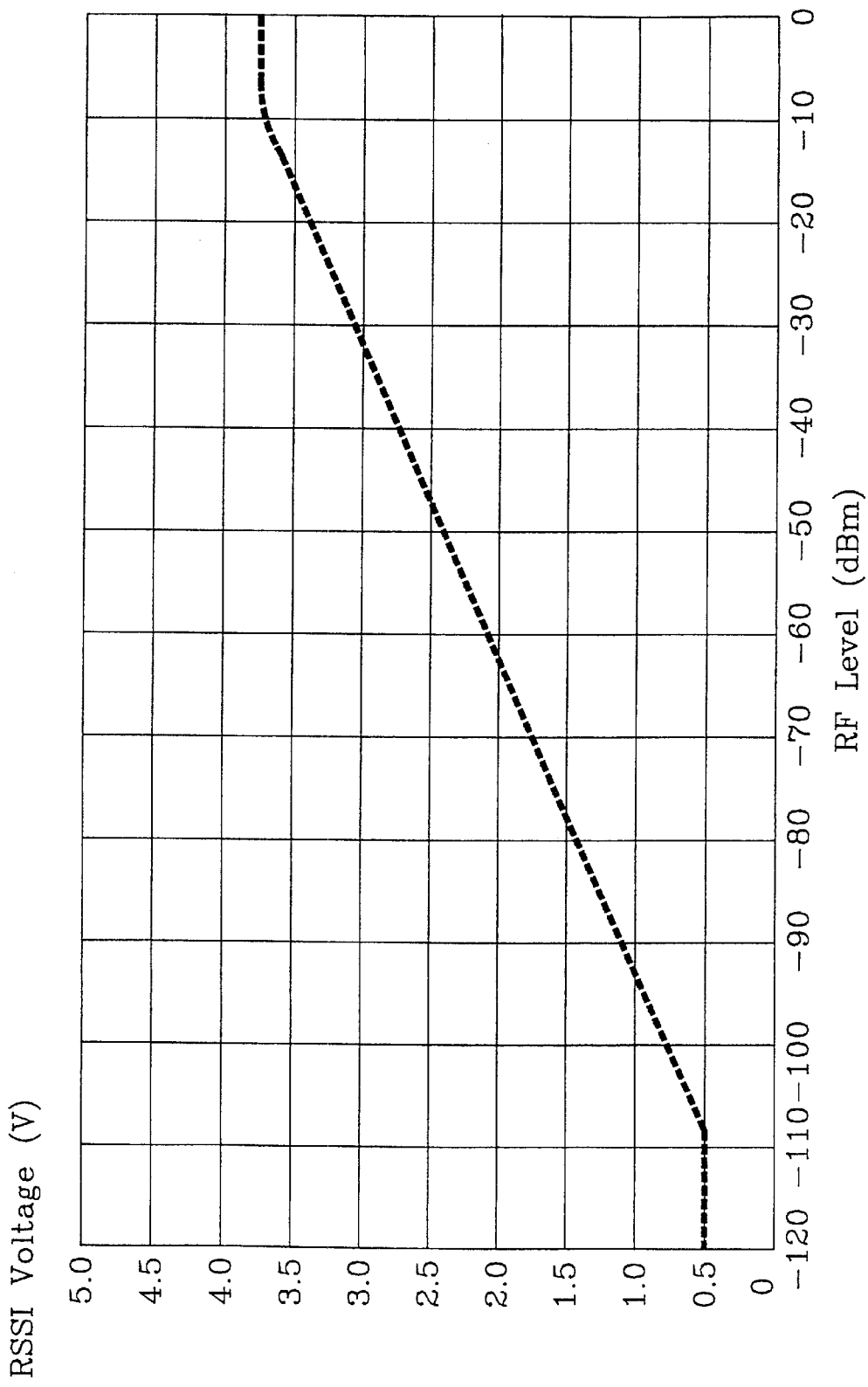
FIG. 5 is a graph showing the voltage of the received signal strength indicator detected by the received signal strength detection circuit constructed according to the present invention versus the received signal strength.

When SA606 IC is used for the IF processor 170, the RSSI detection circuit according to the present invention operates as follows:

If a signal of 0 dBm is supplied to an RFin terminal of the IF processor 170, a voltage of more than 0.6 volts is caught at the base terminal of the transistor TR1 by the transistor TR2, and therefore, a current of about 13 µA flows through the collector. The RSSI voltage in this case is included in the RSSI dynamic range as shown in FIG. 5. In the meantime, in case a low signal of less than −30 dBm is supplied, only a voltage of 0.6 volts is caught at the base terminal of the transistor TR1 by the transistor TR2, and therefore, a current of about 5 µA flows through the collector. The RSSI voltage in this case is also included in the RSSI dynamic range as shown in FIG. 5.

However, if the level of a received signal is low, the signal to noise and distortion ratio (SINAD) of the receiver can become inferior relatively by AC coupling. Therefore, it is necessary to select the value of a resistor R3 which is used for AC coupling of the received signal to be proper. That is, if the level of the received signal is high, the resistor value of R3 should be selected to have sufficient linearity, while if the level of the received signal is low, SINAD should be selected to be maximum.

In the meantime, from FIG. 4, it can be seen that a variable resistor Rt is connected between the RSSI terminal of the IF processor 170 and a resistor R1. The reason for this additional variable resistor Rt is to have the maximum SINAD. Another reason for this additional variable resistor Rt is to maintain a constant output of an RSSI voltage at a constant level of a received signal. It means that if the resistor value of the variable resistor Rt is properly controlled, the output of an RSSI voltage can be maintained constantly since an RSSI offset is minimized.

For the RSSI detection circuit of the present invention, the RSSI dynamic range without affecting receiving sensitivity is 0 dBm through −80 dBm, and the RSSI dynamic range of the received signal seen from the antenna is −30 dBm through −90 dBm. These dynamic ranges can be used efficiently for a CT-2 system.

As explained in the above, the present invention is characterized by having another current flow in addition to the existing RSSI detection circuit. Therefore, there is an advantage that the gain of the first IF processor (FM IF IC front end) can be designed more freely, and thus receiving sensitivity can be improved, since the RSSI dynamic range of the second IF processor (FM IF IC) can be extended. There is another advantage in that the range of the voltages which can be controlled by a transmitter can be extended as the RSSI dynamic range is extended. Still further, there is an advantage in that the near value and the far value used for link setting can be extended to a set range.

While the invention has been described in terms of a single preferred embodiment, those skilled in the art will recognize that the invention can be practiced with various modifications within the spirit and scope of the appended claims.

What is claimed is:

1. A received signal strength detector for a receiver of a mobile communications system, comprising:
   a first intermediate frequency processor for processing a transmitted radio frequency signal at a first intermediate frequency zone to produce a first intermediate frequency signal;
   a second intermediate frequency processor for processing said first intermediate frequency signal at a second frequency zone to produce a second intermediate frequency signal;
   a first path connected to an output terminal of said second intermediate frequency processor for providing a flow path for a current corresponding to the strength of said second intermediate frequency signal, said first path comprising a voltage divider connected between said output terminal of said second intermediate frequency processor and ground; and
   a second path for providing an additional flow path for the current flowing through said first path in response to said first intermediate frequency signal, said second path connecting an output terminal of said first intermediate frequency processor to a voltage division point of said voltage divider.

2. The detector as defined in claim 1, said first path comprising at least two resistances connected between said output terminal of said second intermediate frequency processor and ground.

3. The detector as defined in claim 1, said first path comprising a first resistance and a second resistance connected in series between said output terminal of said second intermediate frequency processor and ground.

4. The detector as defined in claim 3, said first path further comprising a variable resistance connected in series with said first resistance and said second resistance.

5. The detector as defined in claim 3, said second path connecting an output terminal of said first intermediate frequency processor to a connecting point between said first resistance and said second resistance in response to said first intermediate frequency signal.

6. The detector as defined in claim 5, said second path comprising a transistor having a base connected to an output terminal of said first intermediate frequency processor, a collector connected to a connecting point of said first resistance and said second resistance, and an emitter connected to ground.

7. A received signal strength detector for a receiver of a mobile communications system, comprising:
   a first intermediate frequency processor for processing a transmitted radio frequency signal at a first intermediate frequency zone to produce a first intermediate frequency signal;
   a second intermediate frequency processor for processing said first intermediate frequency signal at a second frequency zone to produce a second intermediate frequency signal;
   a current path connected to an output terminal of said second intermediate frequency processor to provide a flow path for a current corresponding to the strength of said second intermediate frequency signal, said current path comprising a voltage divider connected between said output terminal of said second intermediate frequency processor and ground; and
   a current increasing circuit for increasing the amount of the current flowing through said current path in accordance with said first intermediate frequency signal, said current increasing circuit connecting an output terminal of said first intermediate frequency processor to a voltage division point of said voltapge divider.

8. The detector as defined in claim 7, said current increasing circuit increasing the amount of a current flowing through said current path as the level of said first intermediate frequency signal increases.

9. The detector as defined in claim 8, said current path comprising at least two resistances connected between said output terminal of said second intermediate frequency processor and ground.

10. The detector as defined in claim 8, said current path comprising a first resistance and a second resistance connected in series between said output terminal of said second intermediate frequency processor and ground.

11. The detector as defined in claim 10, said current path further comprising a variable resistance connected in series with said first resistance and said second resistance.

12. The detector as defined in claim 10, said current increasing circuit connecting an output terminal of said first intermediate frequency processor to a connecting point between said first resistance and said second resistance in response to said first intermediate frequency signal.

13. The detector as defined in claim 12, said current increasing circuit comprising a transistor having a base connected to said output terminal of said first intermediate frequency processor, a collector connected to the connecting point of said first resistance and said second resistance, and an emitter connected to ground.

14. A received signal strength detector for a receiver of a mobile communications system, comprising:
   a first intermediate frequency processor for processing a transmitted radio frequency signal at a first intermediate frequency zone to produce a first intermediate frequency signal;
   a second intermediate frequency processor for processing said first intermediate frequency signal at a second frequency zone to produce a second intermediate frequency signal;
   a current path connected between an output terminal of said second intermediate frequency processor and ground for providing a flow path for a current corresponding to the strength of said second intermediate frequency signal, said current path comprising a voltage divider connected between said output terminal of said second intermediate frequency processor and ground; and
   a variable current element connected between said output terminal of said second intermediate frequency processor and said current path for controlling the amount of a current corresponding to the strength of said second intermediate frequency signal, said variable current element connecting an output terminal of said first intermediate frequency processor to a voltage division point of said voltage divider.

15. The detector as defined in claim 14, said current path comprising a first resistance and a second resistance connected in series between said output terminal of said second intermediate frequency processor and round.

16. The detector as defined in claim 14, said variable current element comprising a variable resistance connected between said output terminal of said second intermediate frequency processor and said current path.

* * * * *